(12) United States Patent
Egawa

(10) Patent No.: US 11,970,796 B2
(45) Date of Patent: Apr. 30, 2024

(54) TWO-LAYER FABRIC FOR UNWOVEN FABRIC

(71) Applicant: NIPPON FILCON CO., LTD., Tokyo (JP)

(72) Inventor: Toru Egawa, Shizuoka (JP)

(73) Assignee: NIPPON FILCON CO., LTD., Tokyo (JP)

( * ) Notice: Subject to any disclaimer, the term of this patent is extended or adjusted under 35 U.S.C. 154(b) by 335 days.

(21) Appl. No.: 16/096,555

(22) PCT Filed: Feb. 7, 2017

(86) PCT No.: PCT/JP2017/004322
§ 371 (c)(1),
(2) Date: Oct. 25, 2018

(87) PCT Pub. No.: WO2017/187705
PCT Pub. Date: Nov. 2, 2017

(65) Prior Publication Data
US 2019/0136422 A1    May 9, 2019

(30) Foreign Application Priority Data
Apr. 28, 2016    (JP) ................................ 2016-090923

(51) Int. Cl.
*D03D 3/04* (2006.01)
*B32B 5/02* (2006.01)
(Continued)

(52) U.S. Cl.
CPC .............. *D03D 3/04* (2013.01); *B32B 5/024* (2013.01); *D03D 11/00* (2013.01); *D03D 15/275* (2021.01);
(Continued)

(58) Field of Classification Search
CPC .......... Y10T 442/3195–3211; Y10T 442/3179; Y10T 442/3203; D03D 11/00–02; D03D 3/04; D03D 25/005
(Continued)

(56) References Cited

U.S. PATENT DOCUMENTS 5,334,289 A * 8/1994 Trokhan ................ D21F 11/006
162/358.2
7,861,747 B2    1/2011 Quigley
(Continued)

FOREIGN PATENT DOCUMENTS

| CA | 2920999 A1 | 9/2015 |
| EP | 2 458 048 A2 | 5/2006 |

(Continued)

OTHER PUBLICATIONS

International Search Report issued in Application No. PCT/JP2017/004322, dated Apr. 25, 2017.
(Continued)

*Primary Examiner* — Marla D McConnell
*Assistant Examiner* — Kevin Worrell
(74) *Attorney, Agent, or Firm* — Michael Best & Friedrich LLP

(57) ABSTRACT

The object of the present invention is to provide a two-layer fabric for manufacturing a unwoven fabric which can reduce the sticking of the fiber generated upon the manufacturing of the unwoven fabric, while add the excellent lateral rigidity, the excellent diagonal rigidity, and the excellent sheet supportability to the two-layer fabric for manufacturing the unwoven fabric.

In the two-layer fabric for manufacturing the unwoven fabric comprising a right surface side layer consisting of wefts of the right surface side and warps of the right surface side, and a back surface side layer consisting of wefts of the
(Continued)

back surface side and warps of the back surface side, the two-layer fabric for manufacturing the unwoven fabric further comprises a first pair of wefts in which a binding warp on the right surface side serving as a binding yarn and a binding warp on the back surface side serving as a binding yarn are arranged in a substantially vertical direction, a second pair of warps in which a warp on the right surface side and a warp on the back surface side are arranged in a vertical direction to be overlapped with each other, and a third pair of warps in which two warps on the right surface side are arranged adjacent to each other.

6 Claims, 1 Drawing Sheet

(51) Int. Cl.
D03D 11/00 (2006.01)
D03D 15/275 (2021.01)
D03D 15/283 (2021.01)

(52) U.S. Cl.
CPC ..... *D03D 15/283* (2021.01); *D10B 2321/021* (2013.01); *D10B 2321/042* (2013.01)

(58) Field of Classification Search
USPC .......................................... 442/205–207, 203
See application file for complete search history.

(56) References Cited

U.S. PATENT DOCUMENTS

| | | |
|---|---|---|
| 2009/0205740 A1 | 8/2009 | Quigley |
| 2014/0020786 A1 | 1/2014 | Usuki |
| 2014/0127959 A1 | 5/2014 | Usuki et al. |
| 2016/0369432 A1 | 12/2016 | Egawa et al. |

FOREIGN PATENT DOCUMENTS

| | | | | |
|---|---|---|---|---|
| GB | 1028142 A | * | 5/1966 | ............. D03D 11/02 |
| JP | H02-068384 A | | 3/1990 | |
| WO | WO-9914425 A1 | * | 3/1999 | ............ D21F 11/006 |
| WO | WO-2012/140992 A1 | | 10/2012 | |
| WO | WO-2012/140993 A1 | | 10/2012 | |
| WO | WO-2015/132867 A1 | | 9/2015 | |

OTHER PUBLICATIONS

Extended Search Report issued in European Application No. 17788994.6, dated Oct. 10, 2019.
Office Action issued in Japanese Application No. 2016-090923, dated May 13, 2020.
Article 94(3) EPC Communication issued in European Application No. 17788994.6, dated Aug. 14, 2020.
Article 94(3) EPC Communication issued in European Application No. 17788994.6, dated Feb. 9, 2021.
Office Action issued in Canadian Application No. 3,016,404, dated Feb. 15, 2023.

* cited by examiner

TWO-LAYER FABRIC FOR UNWOVEN FABRIC

TECHNICAL FIELD OF THE INVENTION

The present invention relates to a two-layer fabric used for manufacturing unwoven fabric, in particular, relates to the two-layer fabric used for manufacturing unwoven which can keep a surface density of the fabric supporting the unwoven fabric constant, while at the same time improve a dehydration property and an air permeability inside the fabric, as compared with the conventional fabric. In addition, in the present invention, the sticking of the fiber upon the manufacturing of the unwoven fabric can be reduced, while an excellent lateral rigidity, an excellent diagonal rigidity, and an excellent sheet supportability can be added to the two-layer fabric used for manufacturing unwoven fabric.

BACKGROUND ART

At present, there are various ways for manufacturing unwoven fabric. For instance, in a span bond method, properties such as a lateral rigidity, air permeability, a sheet supportability are required for unwoven fabric. In a machine for manufacturing unwoven fabric, it is necessary for the shift of the unwoven fabric to be adjusted by applying a palm to the unwoven fabric, since the unwoven fabric is laterally shifted during its running. For this reason, if the lateral rigidity of the fabric used for the unwoven fabric is low, a technical problem in which the fabric used for the unwoven fabric is folded due to the interference by the palm arises.

In addition, the air permeability required for the fabric used for the unwoven fabric needs to be appropriately set in accordance with the fabric to be manufactured. A technical problem in which the fiber is removed if the air permeability in the fabric used for the unwoven fabric is too high, and a vacuum effect is reduced if the air permeability in the fabric used for the unwoven fabric is too low arises. Still further, a technical problem in which if the sheet supportability is too low, the unwoven fabric to be formed is folded due to the fact that the unwoven fabric is shifted on the fabric upon the transportation of the unwoven fabric.

More specifically, a conventional fabric is the one shown in FIG. 19 in the Patent Publication 1. In such a conventional fabric, the air permeability at the initial state is very excellent, but a technical problem in which the fiber contained in the product sticks into the fabric with time due to its repeatedly use for the manufacturing of the unwoven fabric. Here, the sticking of the fiber is to be defined as a phenomena in which the fiber enters between the intersection of the knuckles of wires. If the sticking of the fiber occurs, the wires bite the unwoven fabric, or the air permeability of the fabric is reduced.

In addition, generally, the force supporting the intersection at the knuckle for a single yarn tends to be high, while the force supporting the intersection at the knuckle for a plurality of yarns tends to be low. For this reason, a structure the force supporting the intersection of which is the highest is known to be a plain weaving structure. Since each of all knuckles forms a pattern in which it engages one yarn, the knuckle density is the highest, so that the force supporting the intersection becomes high.

However, in a general fabric for manufacturing unwoven fabric, if the diameter of the weft is made large, the surface density becomes low, so that it is technically difficult to manufacture a plain weaving structure due to the incompatibility between the lateral rigidity and the surface density.

In order to solve the above technical problem, a multi-layer fabric for manufacturing the unwoven fabric which exhibits the excellent air permeability, the excellent lateral rigidity, the excellent surface density, the excellent diagonal rigidity, and the excellent sheet supportability but reduces the sticking of the fiber was developed (refer to Patent Publication 2).

On the other hand, the fabric is generally formed by weaving warps with wefts. In each of the yarns woven with each other, its shape is deformed due to the fact that it is folded and bent in various directions. In addition, in a case where the fabric is thermally processed, the yarns woven with each other tend to largely deform in the direction of the wefts, since a tension is exerted on the warps. In short, it is well known that the fabric is caused curl in its widthwise direction. Further, the various yarns constituting the fabric is widely known. For instance, The various material of the yarn constituting the fabric is widely known. For instance, polyester, polyamide, polyphenylene sulfide, polyvinylidene fluoride, polypropylene, aramid, polyether ketone, polyethylene naphthalate, and polytetrafluoroethylene can be used for the yarns for the fabric.

On the other hand, in a case where such above yarns are used for the fabric, the fabric tends to curl in its widthwise direction, since the yarns are caused to shrink due to the thermal process of the fabric. In addition, it a two-layer fabric, it sometimes occurs that the diameter of the fabric on the right surface side differs from that of the fabric on the back surface side, or that the number of the yarns of the fabric on the right surface side differs from that of the fabric on the back surface side.

Since the above factors are related to each other in a complex manner to cause the shrinking force on the right surface side of the fabric and that of the back surface side of the fabric to differ from each other, the curl in the widthwise direction of the fabric still more tends to occur.

Such a curling problem of the fabric an occur on the multi-layered fabric for the unwoven fabric are disclosed in the Patent Publication 2, however, an effective method to solve this curling problem has not been found so far.

Patent Publication 1: Japanese Patent Laid-open Publication HEI02-68384

Patent Publication 2: International Patent Laid-open Publication WO2012/140992

DISCLOSURE OF THE INVENTION

Technical Problems to be Solved by Present Invention

The object of the present invention is to provide a two-layer fabric for manufacturing a unwoven fabric which can keep the surface density of the fabric supporting the unwoven fabric uniform, while at the same time improve the dehydration and the air permeability inside the fabric, as compared with the conventional fabric. In addition, the object of the present invention is to provide a two-layer fabric for manufacturing a unwoven fabric which can reduce the sticking of the fiber generated upon the manufacturing of the unwoven fabric, while add the excellent lateral rigidity, the excellent diagonal rigidity, and the excellent sheet supportability to the two-layer fabric for manufacturing the unwoven fabric.

The two-layer fabric for manufacturing the unwoven fabric of the present invention reduces the sticking problem of the fiber, exhibits the excellent air permeability, the excellent lateral rigidity, and improves the surface density, the diagonal rigidity, the sheet supportability, and the lateral rigidity.

In order to solve the above technical problems, the present invention adopts the following structures.

(1) In the two-layer fabric for manufacturing the unwoven fabric comprising a right surface side layer consisting of wefts of the right surface side and warps of the right surface side, and a back surface side layer consisting of wefts of the back surface side and warps of the back surface side, the two-layer fabric for manufacturing the unwoven fabric further comprises a first pair of wefts in which a binding warp on the right surface side serving as a binding yarn and a binding warp on the back surface side serving as a binding yarn are arranged in a substantially vertical direction, a second pair of warps in which a warp on the right surface side and a warp on the back surface side are arranged in a vertical direction to be overlapped with each other, and a third pair of warps in which two warps on the right surface side are arranged adjacent to each other.

(2) The two-layer fabric for manufacturing the unwoven fabric according to (1), wherein a perfect structure of said two-layer fabric for manufacturing the unwoven fabric includes sixteen warps, said sixteen warps comprises two sets of said first pairs of warps, four sets of said second pair of warps, and two sets of said third pair of warps.

(3) The two-layer fabric for manufacturing the unwoven fabric according to (1) or (2), wherein the diameters of the warps constituting said first pair of warps, said second pair of warps, and said third pair of warps are between 0.30 mm and 0.50 mm, and the diameters of the wefts on the back surface side are between 0.30 mm and 0.70 mm.

It is preferred that the diameter of the warps in the present invention be between 0.30 mm and 0.50 mm. If the diameter of the warp is less than 0.30 mm, there is a possibility that an excellent effect related to the surface density, the sheet supportability, and the rigidity is not obtained. On the other hand, if the diameter of the warp exceeds 0.50 mm, there is a possibility that an excellent effect related to the air permeability, the dehydration is not obtained.

(4) The two-layer fabric for manufacturing the unwoven fabric according to any of (1) to (3), the two-layer fabric for manufacturing the unwoven fabric is formed to be endless by opposed ends of the warps being joined by a loop joint manner.

(5) The two-layer fabric for manufacturing the unwoven fabric according to any of (1) to (3), a portion of, or all of at least said second pair of warps are formed by a carbon line.

(6) The two-layer fabric for manufacturing the unwoven fabric according to any of (1) to (5), wherein the weaving structure of the fabric on the right surface side and the fabric on the back surface side is formed by a plain weaving.

Effect of Invention

In the two-layer fabric for manufacturing the unwoven fabric of the present invention, the technical effect in which the surface density of the fabric supporting the unwoven fabric can be kept uniform, while at the same time, the dehydration and the air permeability inside the fabric can be improved, as compared with the conventional fabric.

In addition, in the two-layer fabric for manufacturing the unwoven fabric of the present invention, the sticking of the fibers generated upon the manufacturing of the unwoven fabric can be reduced, while, the property required for the two-layer fabric for manufacturing the unwoven fabric of the present invention such as the lateral rigidity, the diagonal rigidity, and the sheet supportability can be fulfilled.

EMBODIMENT OF INVENTION

Figure 1:
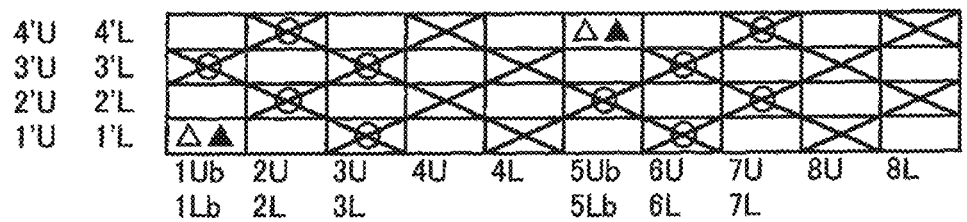
FIG. 1 is a design view showing a complete structure of the two-layer fabric for manufacturing the unwoven fabric of the present invention in a first embodiment.

The structure and the effect of the two-layer fabric for manufacturing the unwoven fabric of the present invention will now be described. Thereafter, the embodiment of the two-layer fabric for manufacturing the unwoven fabric of the present invention will be explained in detail.

The two-layer fabric for manufacturing the unwoven fabric of the present invention is formed by a right surface side fabric consisting of wefts of the right surface side and warps of the right surface side, and a back surface side fabric consisting of wefts of the back surface side and warps of the back surface side being bound by a binding yarn on the right surface side serving as a binding yarn and a binding warp on the back surface side serving as a binding yarn.

In the two-layer fabric for manufacturing the unwoven fabric of the present invention, the binding yarn on the right surface side serving as a binding yarn and the binding warp on the back surface side serving as a binding yarn are arranged in a substantially vertical direction, a second pair of warps in which a warp on the right surface side and a warp on the back surface side are arranged in a vertical direction to be overlapped with each other, and a third pair of warps in which two warps on the right surface side are arranged adjacent to each other.

Here, a binding yarn on the right surface side serving as a binding yarn is to be defined to be the yarn which serves as a binding yarn by weaving the warp originally serving as the warp on the right surface side as an arrangement of the warp in a perfect structure of the two-layer fabric for manufacturing the unwoven fabric, with the weft on the back surface side from the back surface side, while a binding yarn on the back surface side serving as a binding yarn is to be defined to be the yarn which serves as a binding yarn by weaving the warp originally serving as the warp on the back surface side as an arrangement of the warp in a perfect structure of the two-layer fabric for manufacturing the unwoven fabric, with the weft on the right surface side from the right surface side.

In addition, in the first pair of warps, one binding yarn on the right surface side passes above the weft on the right surface side and passes below the weft on the back surface side at a position where it originally passes above the weft on the right surface side as a plain weaving fabric to be woven with each other. At said position, other binding yarn on the back surface side passes above the weft on the right surface side to be woven with each other. In other words, two binding yarns alternately complements knuckles on the right surface side to form the plain weaving structure.

Further, the second pair of warps forms a pair by the warps on the right surface side and the warps on the back surface side being vertically arranged. By weaving a right surface side layer with a back surface side layer, the two-layer fabric for manufacturing the unwoven fabric of the present invention can obtain the properties required for the fabric such as the lateral rigidity, the diagonal rigidity at a high level. Still further, since the two-layer fabric for manufacturing the unwoven fabric of the present invention does not include a binding structure, so that a tension of the fibers can be alleviated.

In addition, the technical feature of the present invention lies in the fact that a single warp on the right surface side among tow warps on the right surface side constituting the third pair of the warps forms a fabric on the right surface side by the yarns originally constituting the warps on the back surface side as a whole structure being woven with the weft on the right surface side.

Such being the case, in the two-layer fabric for manufacturing the unwoven fabric of the present invention, the number of the warps on the right surface side of the fabric becomes larger than that of the warps on the back surface side by making the third pair of the warps an essential element, so that the surface density is increased, whereby a supporting force at the intersection can be largely alleviated. In addition, since the number of the warps on the back surface side is small, the air permeability and the dehydration can be improved.

Further, the sticking of the fiber which is the technical problem for the conventional technology can be improved by means of the warps of the second pair of the warps emerging on the right surface side and the third pair of the warps.

Still further, in the two-layer fabric for manufacturing the unwoven fabric of the present invention, it is preferred that a perfect of the structure of the fabric on the right surfaces side and the fabric on the back surface side be formed by a plain weaving method.

Here, in the present invention, the perfect structure is defined to be a minimum unit the repetition of which forms the fabric structure, in other words, the unit is repeated in right and left directions, and in upper and lower directions to form the fabric.

In the present invention the weft with a large or small diameter can be used despite of the fact that the surface structure is formed by the plain weaving. In the structure of the conventional fabric for the unwoven fabric, the surface density is reduced if a weft with a large diameter is adopted for the plain weaving structure. However, in the present invention, since the first, second, third pairs of warps include the warps, the surface density can be enhanced by adopting the wefts with a large diameter for the weft on the back surface side and the weft on the back surface side with a diameter small than the former weft. In addition, the air permeability can be enhanced by adopting the weft with a large diameter for the weft on the right surface side and the weft with a small diameter for the weft on the back surface side. More specifically, the difference of the diameter between the weft on the right surface side and the weft on the back surface side may be within +−20% of the diameter of the weft on the right surface side. If the diameter of the weft on the right surface side and that on the back surface side exceeds 20%, the balance of the network can be deteriorated, or it becomes technically difficult to form a loop.

In the two-layer fabric for manufacturing the unwoven fabric of the present invention, the air permeability can the surface smoothness can be adjusted by setting the difference of the diameter between the weft on the right surfaces side and the weft on the back surface side to be within +−20%.

The general yarn used for the lower surface side fabric can be polyester, polyamide, polyphenylene sulfide, polypropylene, aramid, polyether ketone, polyethylene naphthalate, polytetrafluoroethylene, etc.

The configuration of the yarn includes, in addition to monofilaments, multifilaments, spun yarns, finished yarns subjected to crimping or bulking such as so-called textured yarn, bulky yarn and stretch yarn, and yarns obtained by intertwining them. As the cross-section of the yarn, not only circular form but also square or short form such as stellar form, or elliptical or hollow form can be used.

The material of the yarns can be freely selected, and is not limited to the specific material.

The configuration of the yarn includes, in addition to monofilaments, multifilaments, spun yarns, finished yarns subjected to crimping or bulking such as so-called textured yarn, bulky yarn and stretch yarn, and yarns obtained by intertwining them. As the cross-section of the yarn, not only circular form but also square or short form such as stellar form, or elliptical or hollow form can be used. The material of the yarn can be selected freely and usable examples of it include polyester, polyamide, polyphenylene sulfide, polyvinylidene fluoride, polypropylene, aramid, polyether ketone, polyethylene naphthalate, polytetrafluoroethylene, cotton, wool and metal. Of course, yarns obtained using copolymers or incorporating or mixing the above-described material with a substance selected depending on the intended purpose may be used.

Since the yarn constituting the fabric for unwoven fabric generally includes a high rigidity, polyester monofilaments with excellent dimension stability may be preferably adopted.

Further, in the present invention, a carbon line can be used for a portion of, or all of the second pair of the warps. Upon the manufacturing of the unwoven fabric, the wire can be electrically charged by static electricity. In such a case, since the wire and the fiber of the unwoven fabric electrically charged repel each other, the unwoven fabric cannot be formed on the wire. Such being the case, the static electricity can be removed by adopting a carbon line for a portion of, or all of the second pair of the warps.

In this connection, the present invention encompasses a case where the carbon line is used for a yarn except of the second pair of warps (the weft on the right surfaces side or the back surface side).

A specific limitation is not put on the diameter of the yarn constituting the fabric, however, it is preferred that the diameter of the warps on the right surface side or the weft on the right surface side constituting a layer on the right surface side be comparatively small in order to make the surface if the fabric fine and smooth. In addition, since the back surface contacting the machine or the roll needs to possess a rigidity or a wear resistance, it is preferred that the diameter of the weft on the back surface side or the warps on the back surface side be comparatively large. Theses diameters may be selected, in view of an application, a circumstance in which the fabric is used, the ratio of the number of the upper wefts to that of the lower wefts.

It is preferred that the two-layer fabric for manufacturing the unwoven fabric of the present invention be made an endless type by connecting the opposed longitudinal ends on a loop joint manner.

Here, in the loop joint, a loop can be formed with at least one weft at the end portion of the fabric being left. Further, in the above formed loop, a loop for joining can be formed by folding back all of, or a portion of the warps at the one, or the both end portions of the fabric to form a loop, and appropriately weaving the formed loop with the weft.

A common hole for inserting a core line below the weft may formed by making a plurality of loops bite.

Now, the embodiments of the present invention will be described below with reference to the drawings. Here, the design view corresponds to the complete structure of the fabric defining the minimum unit to be repeated of the fabric structure. The fabric recited in the claims corresponds to this complete structure. The final product is completed by combining any number of such complete structures in the longitudinal direction and the direction perpendicular to the longitudinal direction.

In each of the design views, the warp is indicated by a reference number such as 1, 2, 3 . . . .

The weft is indicated by a reference number to which ' is attached such as 1', 2', 3' . . . . the yarn on the right surface side is indicated by a reference number to which U is attached, while the yarn on the back surface side is indicated by a reference number to which L is attached such as 1'U, 2'L . . . . In addition, the binding warp yarn binding the fabric on the right surface side with the fabric on the back surface is indicated by a reference number to which b is attached.

In each of the design views, a symbol "▲" indicates that the yarn constituting the one on the back surface side in the first pair of warps is arranged above the weft on the right surface side, a symbol "x" indicates that the binding yarn on the right surface side serving as a binding yarn in the first pair of warps, and the warps on the right surface side in the second pair of warps and the third pair of warps are arranged above the weft on the right surface side, a symbol "Δ" indicates that the binding yarn on the right surface side serving as a binding yarn in the first pair of warps is arranged below the weft on the back surface side, and a symbol "○" indicates that the binding yarn on the back surface side serving as a binding yarn in the first pair of warps, and the warps on the back surface side in the second pair of warps and the third pair of warps are arranged below the weft on the back surface side.

In the explanation of the embodiment, a knuckle is defined to be a portion of a warp which passes above or below one or more wefts to protrude toward the right surface side, and a crimp is defined to be a floating portion of a weft formed on the right surface side by passing above or below a plurality of warps.

First Embodiment

Figure 2:
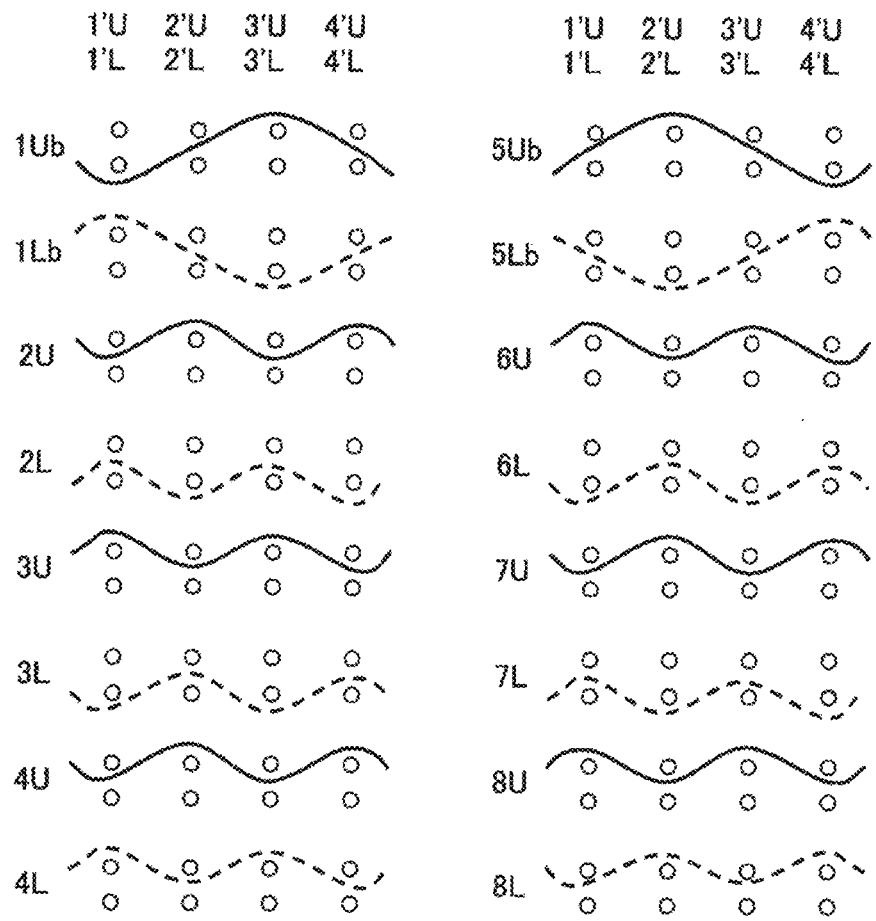
FIG. 2 is a schematic view showing a vertical cross section taken along the warps in FIG. 1.

FIG. 1 is a design view showing a complete structure of the two-layer fabric for manufacturing the unwoven fabric of the present invention in a first embodiment. FIG. 2 is a schematic view showing a vertical cross section taken along the warps in FIG. 1. In FIG. 1, since warps on the right surface side of a third pair of warps (4U and 4L, 8U and 8L) are aligned with each other, they are illustrated by dividing two rows for the clarity.

The two-layer fabric of the first embodiment in FIG. 1 is a plain weaving structure constituted by a first pair of warps (1Ub and 1Lb), two sets of a second pair of warps (2U and 2L, 3U and 3L), a third pair of warps (4U and 3L), a first pair of warps (5Ub and 5Lb), two sets of a second pair of warps (6U and 6L, 7U and 7L), a third pair of warps (8U and 8L), and the wefts on the right surface side (1'U, 2'U, 3'U, 4'U) and wefts on the back surface side (1'L, 2'L, 3'L, 4'L).

As shown in FIG. 2, the warp 1Ub on the right surface side serving as a binding yarn and constituting a first pair of warps passes below the weft 1'L on the back surface side to form a knuckle on the back surface side, and passes between the weft 2'U on the right surface side and the weft 2'L on the back surface side and passes above the weft 3'U on the right surface side to form a knuckle on the right surface side, and passes between the weft 4'U on the right surface side and the weft 4'L on the back surface side to be woven with each other.

In addition, the warp 1Lb on the back surface side serving as a binding yarn and constituting a first pair of warps passes above the weft 1'U on the right surface side to form a knuckle on the right surface side, and passes between the weft 2'U on the right surface side and the weft 2'L on the back surface side and passes below the weft 3'L on the back surface side to form a knuckle on the back surface side, and passes between the weft 4'U on the right surface side and the weft 4'L on the back surface side to be woven with each other.

In addition, the warp 2U on the right surface side constituting a second pair of warps passes below the weft 1'U on the right surface side, and passes above the weft 2'U on the right surface side to form a knuckle on the right surface side, and passes below the weft 3'U on the right surface side and above the weft 4'U on the right surface side to be woven with each other so as to form a knuckle on the right surface side again.

In addition, the warp 3U on the right surface side constituting a second pair of warps passes above the weft 1'U on the right surface side to form a knuckle on the right surface side, and passes below the weft 2'U on the right surface side and above the weft 3'U on the right surface side to form a knuckle on the right surface side again, and passes below the weft 4'U on the right surface side to be woven with each other.

In addition, the warp 3L on the back surface side constituting a second pair of warps passes below the weft 1'L on the back surface side to form a knuckle on the back surface side, and passes above the weft 2'L on the back surface side and below the weft 3'L on the back surface side to form a knuckle on the back surface side again, and passes between the weft 4'L on the back surface side and the weft 4'L on the back surface side to be woven with each other.

In addition, the warp 4U on the right surface side constituting a third pair of warps passes below the weft 1'U on the right surface side and above the weft 2'U on the right surface side to form a knuckle on the right surface side, and passes below the weft 3'U on the right surface side and above the weft 4'U on the right surface side to be woven with each other so as to form a knuckle on the right surface side again.

In addition, the warp 4U on the right surface side constituting a third pair of warps passes above the weft 1'U on the right surface side to form a knuckle on the right surface side, and passes below the weft 2'U on the right surface side and above the weft 3'U on the right surface side to form a knuckle on the right surface side, and passes below the weft 4'U on the right surface side to be woven with each other.

In addition, the warp 5Ub on the right surface side serving as a binding yarn and constituting a first pair of warps passes between the weft 1'U on the right surface side and the weft 1'L on the back surface side and passes above the weft 2'U on the right surface side to form a knuckle on the right surface side, and passes between the weft 3'U on the right surface side and the weft 3'L on the back surface side and below the weft 4'L on the back surface side to a knuckle on the back surface side.

In addition, the warp 5Lb on the back surface side serving as a binding yarn and constituting a first pair of warps passes between the weft 1'U on the right surface side and the weft 1'L on the back surface side and passes below the weft 2'L on the back surface side to form a knuckle on the back surface side, and passes between the weft 3'U on the right surface side and the weft 3'L on the back surface side and above the weft 4'U on the right surface side to a knuckle on the right surface side.

In addition, the right surface side warp 6U consisting the second pair of warps passes above the right surface side weft 1'U to form a knuckle on the right surface side, and passes below the right surface side weft 2'U and above the right surface side weft 3'U to form a knuckle on the right surface again, and passes below the right surface side weft 4'U to be woven with each other. Further, the right surface side warp 6L consisting the second pair of warps passes below the back surface side weft 1'L to form a knuckle on the back surface side, and passes above the back surface side weft 2'L and below the back surface side weft 3'L to form a knuckle on the back surface again, and passes above the back surface side weft 4'L to be woven with each other.

Further, the right surface side warp 7U consisting the second pair of warps passes below the right surface side weft 1'U and above the right surface side weft 2'U to form a knuckle on the right surface side, and passes below the right surface side weft 3'U and above the right surface side weft 4'U to form a knuckle on the right surface again. In addition, the back surface side warp 7L consisting the second pair of warps passes above the back surface side weft 1'L and below the back surface side weft 2'L to form a knuckle on the back surface side, and passes above the back surface side weft 3'L and below the back surface side weft 4'L to form a knuckle on the back surface again.

In addition, the right surface side warp 8U constituting the third pair of warps passes above the right surface side weft 1'U to form a knuckle on the right surface side, and passes below the right surface side weft 2'U and above the right surface side weft 3'U to form a knuckle on the right surface side again, and passes below the right surface side weft 4'U to be woven with each other. Further, the right surface side warp 8U constituting the third pair of warps passes below the right surface side weft 1'U and above the right surface side weft 2'U to form a knuckle on the right surface, and passes below the right surface side weft 3'U and above the right surface side weft 4'U to form a knuckle on the right surface side again.

The two-layered fabric for manufacturing the unwoven fabric of the first embodiment forms a plain weaving pattern by adopting the above structure. The surface density on the fabric supporting the unwoven fabric can be kept uniform and the sheet supportability can be improved by regularly forming the plain weaving pattern on the surface.

In addition, the force supporting the intersection generated on the knuckle of the binding yarn on the right surface side can be alleviated as the entire fabric by arranging three sets of the second pair of warps and the third pair of the warps between two first pair of warps existing the complete structure, so that the sticking of the fibers can be restricted.

Further, the rigidity of the fabric can be enhanced by aligning two sets of the second pair of warps, so that the lateral rigidity of the fabric and the diagonal rigidity of the fiber can be improved without a need to arrange auxiliary wefts, etc. inside the fabric.

What is claimed is:

1. A two-layer fabric consisting only of:
an upper surface side layer consisting of upper surface side wefts and upper surface side warps; and
a lower surface side layer consisting of lower surface side wefts and lower surface side warps;
wherein the upper surface side warps and the lower surface side warps consist only of:
a first pair of warps consisting of a first binding warp and a second binding warp that are arranged adjacently, wherein each of the first binding warp and the second binding warp
passes above one of the upper surface side wefts, passes between one of the upper surface side wefts and one of lower surface side wefts, and passes below one of the lower surface side wefts,
wherein when the first binding warp passes above first one of the upper surface side wefts, the second binding warp passes below first one of the lower surface side wefts which is below the first one of the upper surface side wefts, and
wherein when the second binding warp passes above second one of the upper surface side wefts, the first binding warp passes below second one of the lower surface side weft which is below the second one of the upper side wefts,
constitues as one of the upper surface side warps when the each of the first and second binding warps passes above one of the upper surface side wefts, and
constitutes as one of the lower side warps when the each of the first and second binding warps passes below one of the lower surface side wefts;
a second pair of warps consisting only of
one of the upper surface side warps, the one of the upper surface side warps weaves the upper surface side wefts only, and
one of the lower surface side warps arranged under the one of the upper surface side warps, the one of the lower surface side warps weaves the lower surface side wefts only, and
a third pair of warps consisting only of two of the upper surface side warps that are arranged adjacent to each other, the two of the upper surface side warps weave the upper surface side wefts only,
wherein the third pair of warps does not include the one of the upper surface side warps of the second pair, and
wherein the third pair of warps does not include any one of the lower surface side warps that is woven with the lower surface side wefts; and
wherein a minimum repeated unit of the two-layer fabric consists of four of the upper surface side wefts, four of the lower surface side wefts, two sets of the first pair of warps, four sets of the second pair of warps and two sets of the third pair of warps.

2. The two-layer fabric according to claim 1, wherein one of the four sets of said second pair of warps is formed by a carbon line.

3. The two-layer fabric according to claim 1, wherein a weaving structure of the upper surface side layer and the lower surface side layer is formed by a plain weaving.

4. The two-layer fabric according to claim 1, wherein all of the upper surface side wefts and the lower surface side wefts in the minimum repeated unit are woven with at least one of the upper surface side warps or the lower surface side warps.

5. The two-layer fabric according to claim 1, wherein diameters of the warps constituting said first pair of warps, said second pair of warps, and said third pair of warps are between 0.30 mm and 0.50 mm, and diameters of the lower surface side wefts are between 0.30 mm and 0.70 mm.

6. A two-layer fabric consisting of:
an upper surface side layer consisting of upper surface side wefts and upper surface side warps; and
a lower surface side layer consisting of lower surface side wefts and lower surface side warps;
wherein the upper surface side warps and the lower surface side warps consists of:
a first pair of warps consisting of a first binding warps and a second binding warp that are arranged adjacently, wherein each of the first binding warp and the second binding warp
  passes above one of the upper surface side wefts, passes between one of the upper surface side wefts and one of lower surface side wefts, and passes below one of the lower side wefts,
    wherein when the first binding warp passes above first one of the upper surface side wefts, the second binding warp passes below first one of the lower surface side wefts which is below the first one of the upper surface side wefts, and
    wherein when the second binding warp passes above second one of the upper surface side wefts, the first binding warp passes below second one of the lower surface side wefts which is below the second one of the upper surface side wefts,
    constitutes as one of the upper surface side warps when the each of the first and second binding warps passes above one of the upper surface side wefts, and
    constitues as one of the lower surface side warps when the each of the first and second binding warps passes below one of the lower surface side wefts;
a second pair of warps consisting of
  one of the upper surface side warps, the one of the upper surface side warps weaves the upper surface side wefts only, and
  one of the lower surface side warps arranged under the one of the upper surface side warps, the one of the lower surface side warps weaves the lower surface side wefts only, and
a third pair of warps consisting of two of the upper surface side warps that are arranged adjacent to each other, the two of the upper surface side warps weave the upper surface side wefts only,
  wherein the third pair of warps does not include the one of the upper surface side warps of the second pair; and
wherein a minimum repeated unit of the two-layer fabric consists of four of the upper surface side wefts, four of the lower surface side wefts, two sets of the first pairs of warps, four sets of the second pair of warps and two sets of the third pair of warps.

\* \* \* \* \*